(12) United States Patent
Liao et al.

(10) Patent No.: US 8,030,852 B2
(45) Date of Patent: Oct. 4, 2011

(54) LIGHT DRIVER CIRCUIT DEVICE AND BACKLIGHT DEVICE

(75) Inventors: Cheng-Neng Liao, Hsinchu (TW);
Chia-Hung Sun, Hsinchu (TW);
Huang-Ti Lin, Hsinchu (TW);
Chin-Chuang Chueh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 489 days.

(21) Appl. No.: 12/166,317

(22) Filed: Jul. 1, 2008

(65) Prior Publication Data
US 2009/0206771 A1    Aug. 20, 2009

(30) Foreign Application Priority Data
Feb. 14, 2008    (TW) ................ 97105177 A

(51) Int. Cl.
*H05B 39/04*    (2006.01)
*H05B 37/02*    (2006.01)
(52) U.S. Cl. ........................ 315/224; 315/307
(58) Field of Classification Search .......... 362/546, 362/548, 549, 632, 634, 646; 315/291, 307, 315/208 R, 224, 244, 91, 209 R
See application file for complete search history.

(56) References Cited

U.S. PATENT DOCUMENTS

| | | | |
|---|---|---|---|
| 7,057,678 B2 * | 6/2006 | Ishida et al. ............ | 349/58 |
| 7,242,147 B2 | 7/2007 | Jin | |
| 7,325,964 B2 * | 2/2008 | Kim ...................... | 362/634 |
| 7,531,968 B2 * | 5/2009 | Sengoku et al. .......... | 315/277 |
| 7,758,233 B2 * | 7/2010 | Chang et al. ............ | 362/634 |
| 7,837,377 B2 * | 11/2010 | Lee et al. ............... | 362/633 |
| 2003/0214478 A1 * | 11/2003 | Yoo et al. ............... | 345/102 |
| 2005/0093484 A1 | 5/2005 | Ball | |
| 2006/0279957 A1 * | 12/2006 | Kwon et al. ............. | 362/378 |
| 2006/0284568 A1 | 12/2006 | Chang et al. | |
| 2007/0001621 A1 | 1/2007 | Chan et al. | |
| 2007/0120502 A1 | 5/2007 | Shimura et al. | |
| 2007/0170871 A1 | 7/2007 | Hsu et al. | |

FOREIGN PATENT DOCUMENTS

| | | |
|---|---|---|
| CN | 1737651 | 2/2006 |
| CN | 200975621 | 11/2007 |

OTHER PUBLICATIONS

"First Office Action of China Counterpart Application," issued on Sep. 15, 2010, p. 1-p. 7, in which the listed references were cited.

* cited by examiner

*Primary Examiner* — Douglas W Owens
*Assistant Examiner* — Minh A
(74) *Attorney, Agent, or Firm* — Jianq Chyun IP Office

(57) ABSTRACT

A light driver circuit device for synchronously driving a plurality of cold cathode fluorescent lamps (CCFLs) is provided. The light driver circuit device includes an inverter circuit board and a balance circuit board. The inverter circuit board has an inverter circuit coupled to a driving signal for outputting a driving voltage to drive the CCFLs synchronously. The balance circuit board and the inverter circuit board are installed separately, and the balance circuit board has a balance circuit coupled to a terminal of each CCFL and the inverter circuit. The CCFL driving architecture is designed to install the inverter circuit and the balance circuit individually, thus effectively reducing the space of the driving circuit and the total cost of the circuit design. Furthermore, the balance circuit board can balance the current in each CCFL effectively, and there is no limitation to where the balance circuit board can be disposed.

8 Claims, 6 Drawing Sheets

LIGHT DRIVER CIRCUIT DEVICE AND BACKLIGHT DEVICE

CROSS-REFERENCE TO RELATED APPLICATION

This application claims the priority benefit of Taiwan application serial no. 97105177, filed Feb. 14, 2008. The entirety of the above-mentioned patent application is hereby incorporated by reference herein and made a part of this specification.

BACKGROUND OF THE INVENTION

1. Field of the Invention

The present invention generally relates to a circuit device, and in particular, to a circuit device for driving a light source.

2. Description of Related Art

Liquid crystal displays (LCDs) have gradually become a mainstream display among others. LCD panels are actually electronic controlled light valves and produce visible images by the use of light driver circuit devices. LCDs generally use cold cathode fluorescent lamps ("lamps" for short hereinafter) to provide light sources. Other light driver circuits, such as light emitting diodes (LEDs), also attract some attention, but the applications of them are limited due to the high costs. Since the LCDs are consumer products, besides performances, an overriding factor in design is the cost. Therefore, one of the most important targets in design of the LCD light driver circuits is to reduce the cost.

FIG. 1 shows a conventional light driver circuit device and a lamp assembly. Referring to FIG. 1, an inverter circuit 14 is coupled to a plurality of lamps 11, 12, . . . , 13, for example. Generally speaking, the inverter circuit 14 may convert a DC power source 140 into an AC power source required by the lamps 11, 12, . . . , 13.

For the current applications of medium or small-sized light driver circuits, the liquid crystal screen of a notebook or a desktop computer requires one to four lamp assemblies, and thus the number of the inverter circuits must be one to four sets. Since a large-sized light driver circuit requires more lamps, the inverter circuit uses several sets of transformers 141, 142, . . . , 143 to drive the lamps 11, 12, . . . , 13 in a single side drive mode in FIG. 1. However, with the application of the light driver circuit, the size of the LCD is made to be larger. Therefore, in order to overcome the non-uniform luminance distribution of the light driver circuit device due to the leakage current, a double side drive mode has been provided in the prior art.

FIG. 2 shows a conventional light driver circuit device in the double side drive mode and a lamp assembly. Referring to FIG. 2, the light driver circuit device is installed with two sets of inverter circuits 14, 21, each having a plural sets of transformers 141, 142, . . . , 143 and 211, 212, . . . , 213 respectively coupled to both terminals of the lamps 11, 12, . . . , 13. Although the double side drive mode may reduce the leakage current, the number of the elements required by the inverter also increases, thus increasing the cost of a printed circuit board (PCB). If the number of the elements can be reduced, the cost will be relatively lowered, thereby achieving the current main purpose of the backlight design technique.

SUMMARY OF THE INVENTION

Accordingly, the present invention is directed to a light driver circuit device, which effectively reduces the space of the circuit and the total cost of the circuit design.

The present invention is further directed to a backlight device. The balance circuit board can be disposed freely, thus reducing the space of the circuit board.

The present invention provides a light driver circuit device for synchronically driving a plurality of CCFLs. The light driver circuit device includes an inverter circuit board and a balance circuit board. The inverter circuit board has an inverter circuit coupled to a driving signal for outputting a driving voltage to drive the lamps synchronously. The balance circuit board and the inverter circuit board are installed separately, and the balance circuit board has a balance circuit coupled to a terminal of the CCFLs and the inverter circuit.

In another aspect, the present invention provides a backlight device, which includes a substrate, a lamp, a lamp holder, an inverter module, and a balance circuit board. The lamp holder is disposed on one side of the substrate, for fixing the lamp. The lamp is disposed on one side of the substrate and inside the lamp holder, or the lamp is disposed outside the lamp holder, and even on the other side of the substrate. The inverter module provides at least a driving voltage to drive the lamp. The balance circuit board has one circuit element coupled to the lamp. In addition, the backlight device also includes a reflector and a diffuser in parallel to the reflector. The reflector is disposed on a bottom of the lamp holder, for reflecting lights emitted by the lamp. The diffuser is disposed on a top of the lamp holder, for diffusing lights emitted by the lamp to form a surface light source.

In the present invention, the light driver circuit device is designed to install the inverter circuit and the balance circuit individually, so as to effectively reduce the space of the driving circuit and the total cost of the circuit design. Moreover, the balance circuit board is employed in the present invention, thus balancing the current in each CCFL effectively, and there is no limitation where the balance circuit board can be disposed.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
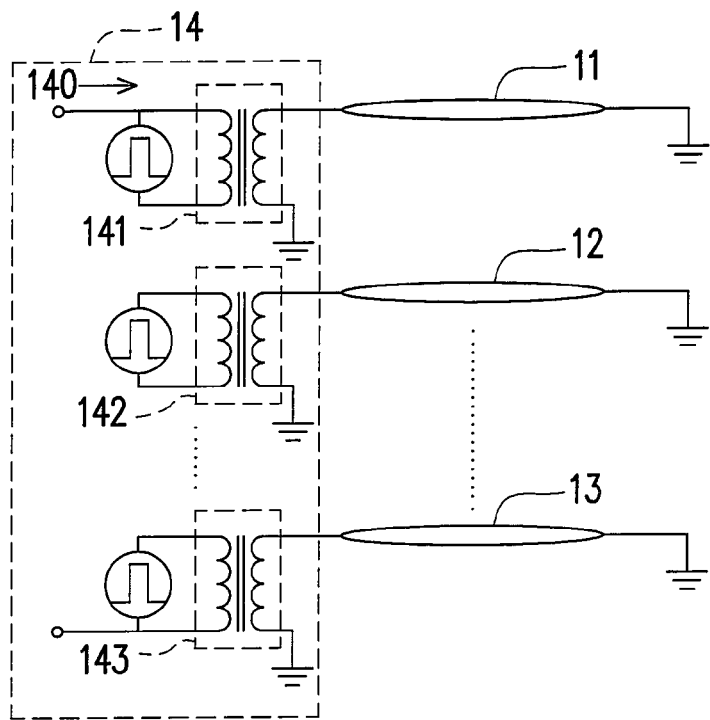
FIG. 1 is a circuit block diagram of a conventional light driver circuit device for driving a plurality of lamps in a single side drive mode.
Figure 2:
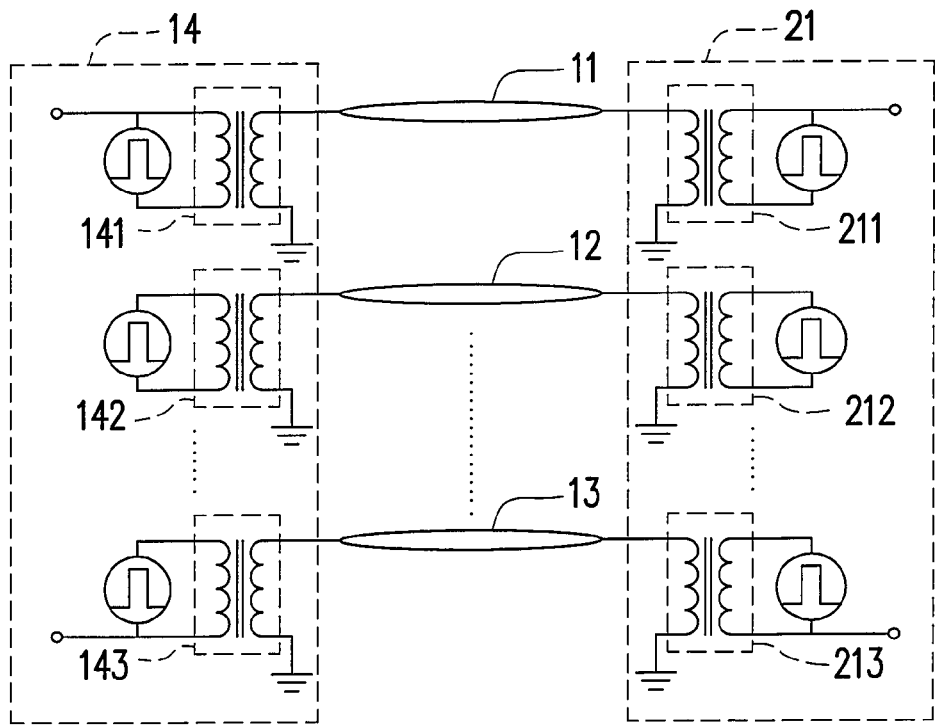
FIG. 2 is a circuit block diagram of a conventional light driver circuit device for driving a plurality of lamps in a double side drive mode.

Reference will now be made in detail to the present embodiments of the invention, examples of which are illustrated in the accompanying drawings. Wherever possible, the same reference numbers are used in the drawings and the description to refer to the same or like parts.

Figure 3:
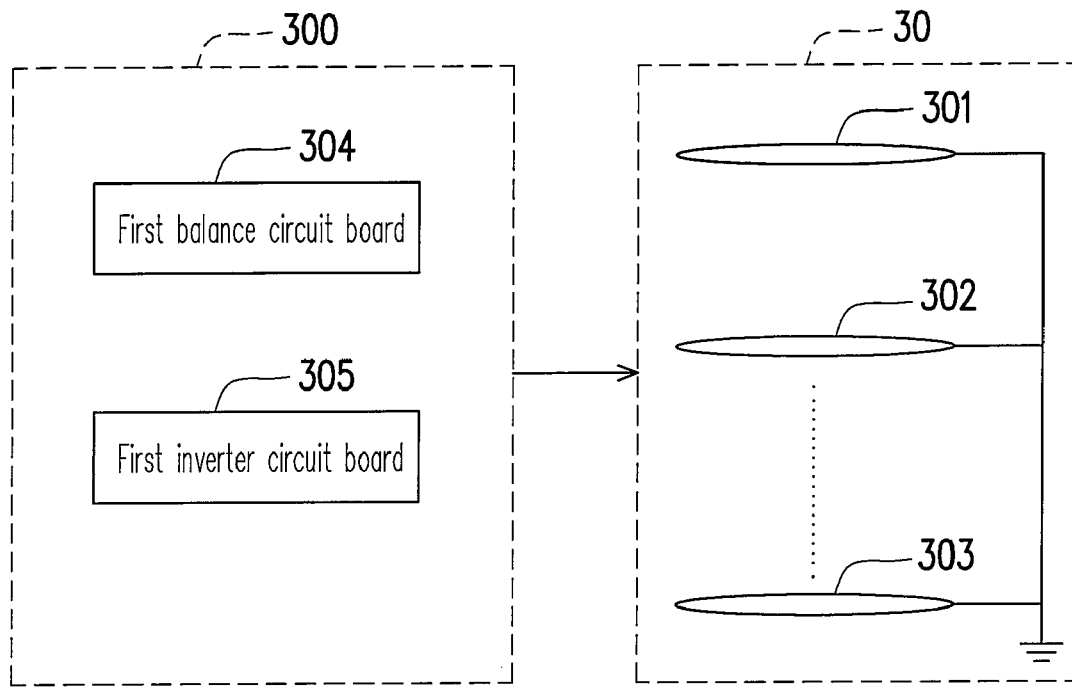
FIG. 3 is a circuit block diagram of a light driver circuit device according to an embodiment of the present invention.

FIG. 3 is a circuit block diagram of a light driver circuit device according to an embodiment of the present invention. Referring to FIG. 3, the light driver circuit device 300 is used to drive a plurality of lamps 301, 302, . . . , 303 in a lamp assembly 30. The light driver circuit device 300 includes a first balance circuit board 304 and a first inverter circuit board 305. In particular, the first inverter circuit board 305 and the first balance circuit board 304 are installed separately. In this embodiment, the first inverter circuit board 305 has an inverter circuit for outputting a driving voltage to drive the lamps 301, 302, . . . , 303. In addition, the first balance circuit board 304 also has a balance circuit for uniformly distributing the driving voltage to the lamps 301, 302, . . . , 303.

In some embodiments, the balance circuit of the balance circuit board 304 may include a capacitor, an inductor, a switch, or a resistor. Several embodiments will be given below to illustrate the structure of the light driver circuit device 300.

First Embodiment

Figure 4:
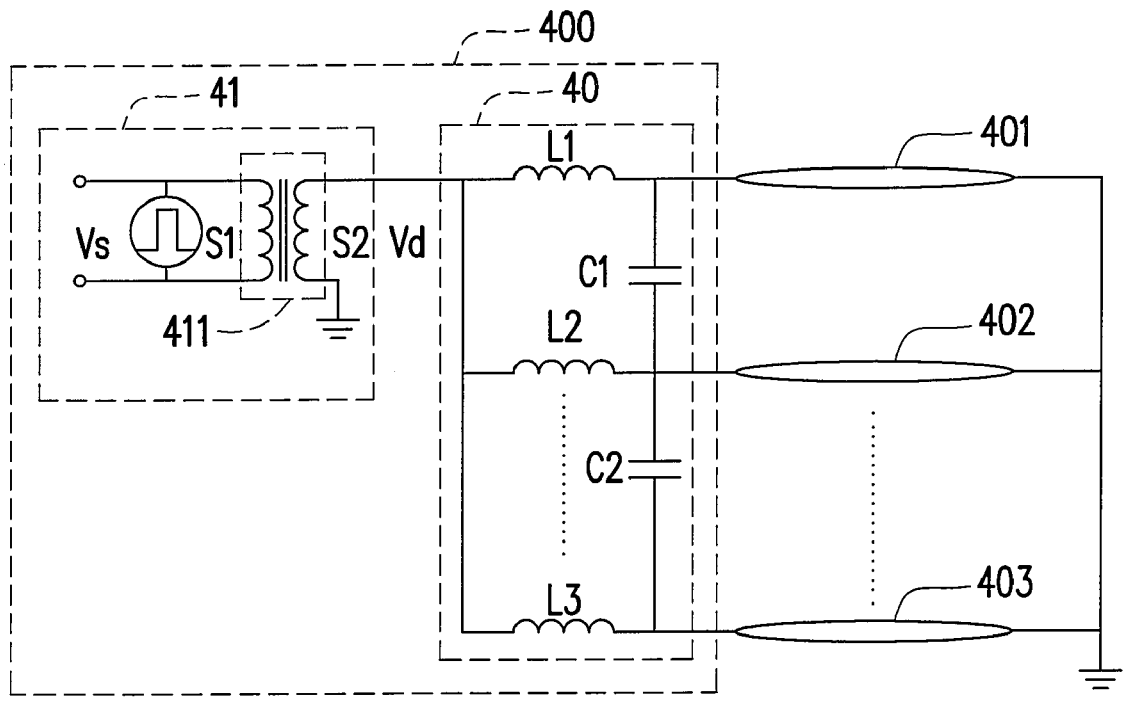
FIG. 4 is a circuit block diagram of a first embodiment of the light driver device in FIG. 3.

FIG. 4 is a circuit block diagram of a first embodiment of the light driver device 300 in FIG. 3. Referring to FIG. 4, the light driver device 400 includes a first inverter circuit board 41 and a first balance circuit board 40. The first inverter circuit board 41 has an inverter circuit coupled to a balance circuit on the first balance circuit board 40, and the balance circuit is coupled to lamps 401, 402, . . . , 403.

The inverter circuit on the first inverter circuit board 41 has a first transformer 411 with a primary side S1 for receiving one driving signal Vs. In addition, a secondary side S2 of the first inverter 411 has one end grounded and the other end coupled to the first balance circuit board 40. Thus, the secondary side of the first transformer 411 may sense the driving signal Vs received by the primary side, and output a driving signal Vd.

Further, the balance circuit on the first balance circuit board 40 includes several inductors L1, L2, . . . , L3, and several capacitors C1, . . . , C2. One ends of the inductors L1, L2, . . . , L3 are coupled to the secondary side S2 of the first transformer 41, and the other ends are respectively coupled to high-voltage sides of the corresponding lamps 401, 402, . . . , 403. Further, the capacitors C1, . . . , C2 connect the high-voltage sides of adjacent lamps. In this embodiment, low-voltage sides of the lamps 401, 402, . . . , 403 are commonly grounded.

When the primary side of the first inverter 411 receives the driving signal Vs, the secondary side may sense the driving signal Vs and outputs a driving voltage Vd to the first balance circuit board 40. At this time, the inductors L1, L2, . . . , L3 and capacitors C1, . . . , C2 on the first balance circuit board 40 receive and uniformly distribute the driving voltage Vd provided by the first transformer 411 to the lamps 401, 402, . . . , 403, so as to respectively drive the lamps 401, 402, . . . , 403 to emit light.

Second Embodiment

Figure 5:
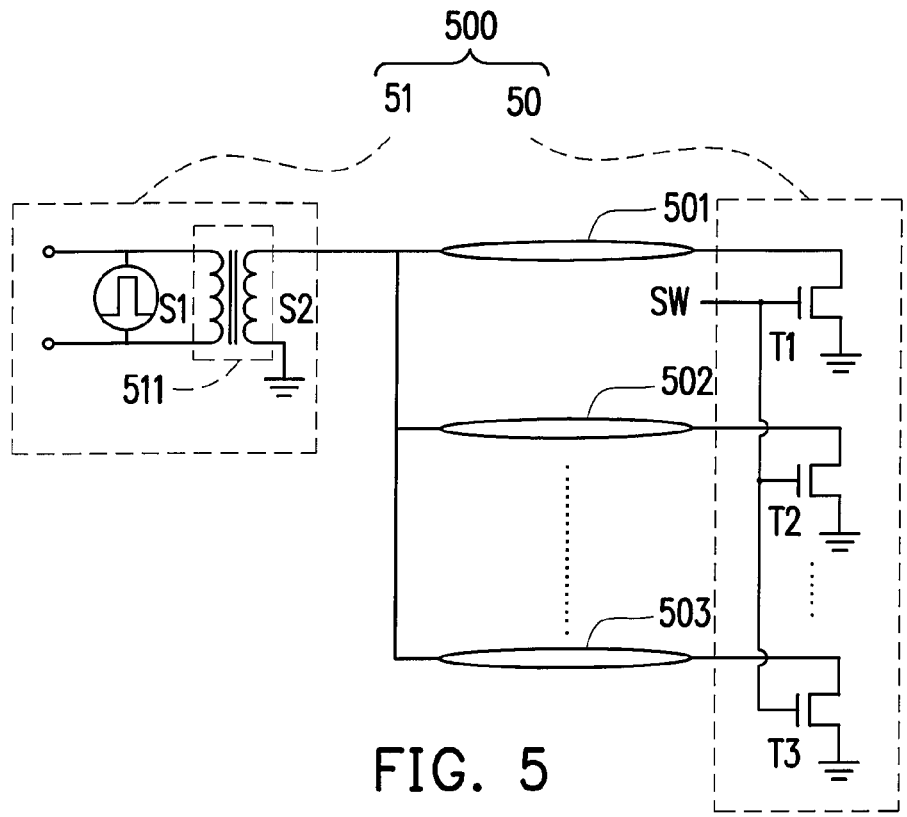
FIG. 5 is a circuit block diagram of a second embodiment of the light driver device in FIG. 3.

FIG. 5 is a circuit block diagram of a second embodiment of the light driver device 300 in FIG. 3. Referring to FIG. 5, the light driver device 500 also includes a first inverter circuit board 51 and a first balance circuit board 50. The first inverter circuit board 51 has an inverter circuit with a first transformer 511. The first transformer 511 further has a primary side S1 and a secondary side S2. Similarly, the primary side S1 of the transformer 511 receives a driving signal Vs, and the secondary side S2 has one end grounded and the other end coupled to high-voltage sides of lamps 501, 502, . . . , 503. The operating mode of the inverter circuit has been illustrated in the above embodiment, and will not be described herein again.

In this embodiment, the balance circuit on the first balance circuit board 50 includes a plurality of switches, for example, T1, T2, . . . , T3. The switches are respectively coupled to low-voltage sides of the lamps 501, 502, . . . , 503. In this embodiment, the switches T1, T2, . . . , T3 may be realized by transistors. Each switch transistor has a first source/drain end coupled to a low-voltage terminal of the corresponding lamp, a second source/drain end grounded, and a gate end coupled to a switching signal SW. Thus, when the switching signal SW is enabled, each of the switches T1, T2, . . . , T3 may ground the low-voltage sides of the corresponding lamp 501, 502, . . . , 503. At this time, the balance circuit board 40 distributes the driving voltage to each of the lamps 501, 502, . . . , 503, so as to drive the lamps 501, 502, . . . , 503 to emit light.

Third Embodiment

Figure 6:
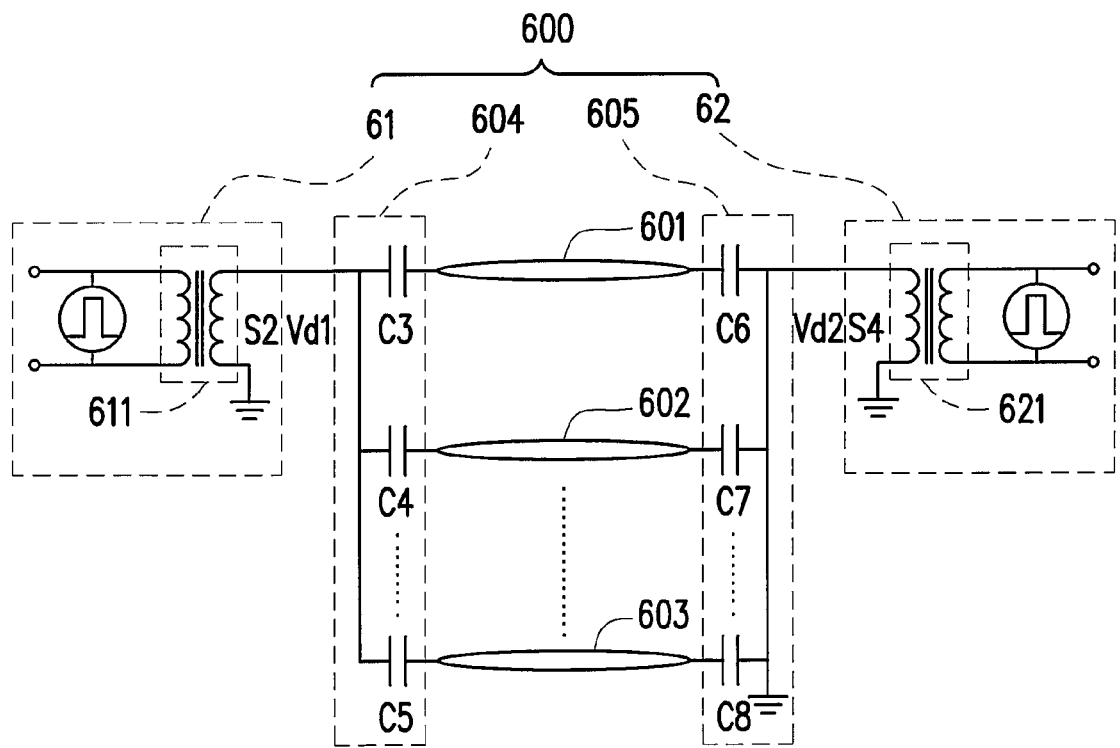
FIG. 6 is a circuit block diagram of a third embodiment of the light driver device in FIG. 3.

FIG. 6 is a circuit block diagram of a third embodiment of the light driver device 300 in FIG. 3. Referring to FIG. 6, the light driver device 600 includes a first inverter circuit board 61, a second inverter circuit board 62, a first balance circuit board 604, and a second balance circuit board 605. Compared with the single side drive mode in the above two embodiments, this embodiment adopts two sets of inverter circuit boards 61 and 62, which belongs to a double side drive mode.

A first transformer 611 of an inverter circuit on the first inverter circuit board 61 has a secondary side S2. A second transformer 621 of an inverter circuit on the second inverter circuit board 62 has a secondary side S4. The secondary sides S2, S4 are respectively coupled to the first balance circuit board 604 and the second balance circuit board 605, and lamps 601, 602, . . . , 603 are coupled between the first balance circuit board 604 and the second balance circuit board 605. The balance circuits on the first balance circuit board 604 and the second balance circuit board 605 respectively include capacitors C3, C4, . . . , C5 and C6, C7, . . . , C8.

One ends of the capacitors C3, C4, . . . , C5 of the first balance circuit board 604 are commonly coupled to the secondary side S2 of the first transformer 611, and the other ends are coupled to the corresponding lamps 601, 602, . . . , 603. One ends of the capacitors C6, C7, . . . , C8 of the second balance circuit board 605 are commonly coupled to the secondary side S4 of the second transformer 621, and the other ends are coupled to the corresponding lamps 601, 602, . . . , 603. The capacitors C3, C4, . . . , C5 of the first balance circuit board 604 and the capacitors C6, C7, . . . , C8 of the second balance circuit board 605 respectively receive and uniformly distribute driving voltages Vd1 and Vd2 provided by the first transformer 611 and the second transformer 621 to the lamps 601, 602, . . . , 603, so as to drive the lamps to emit light.

Several embodiments of the light driver device are given above, which are not intended to limit the scope of the present invention. In some alternative embodiments, the balance circuit board may also be constituted by resistors or other elements, or even a variation of the coupling relationship between the elements in the above embodiments. Therefore, it falls within the protection scope of the present invention as long as the inverter circuit board and the balance circuit board are installed separately.

In the present invention, since the inverter circuit board and the balance circuit board are installed separately, the balance circuit board can be disposed in various manners. Several embodiments of a backlight device using the aforementioned light driver device are given below to illustrate the arrangements of the balance circuit board.

FIGS. 7A to 7G are side views of a backlight device according to an embodiment of the present invention. First referring to FIG. 7A, the backlight device of this embodiment includes a substrate 73, a lamp 71, a lamp holder 72, an inverter module 77, and a balance circuit board 76. The lamp holder 72 is disposed on one side of the substrate 73, for fixing the lamp 71. The lamp 71 may be disposed on one side of the substrate 73 and inside the lamp holder 72, or disposed outside the lamp holder 72, or even disposed on the other side of the substrate 73. The inverter module 77 provides at least one driving voltage for driving the lamp 71.

Figure 7A:
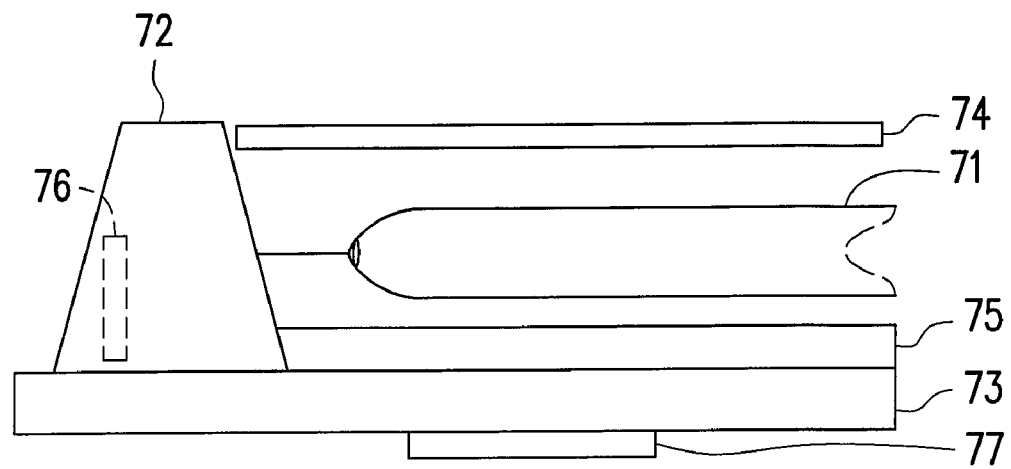
FIGS. 7A to 7G are side views of a backlight device according to an embodiment of the present invention.
Figure 7B:
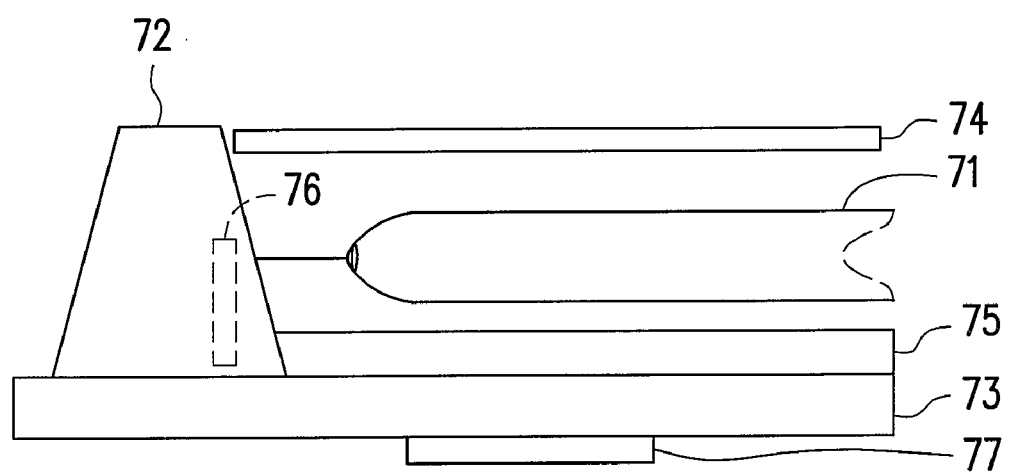
Figure 7C:
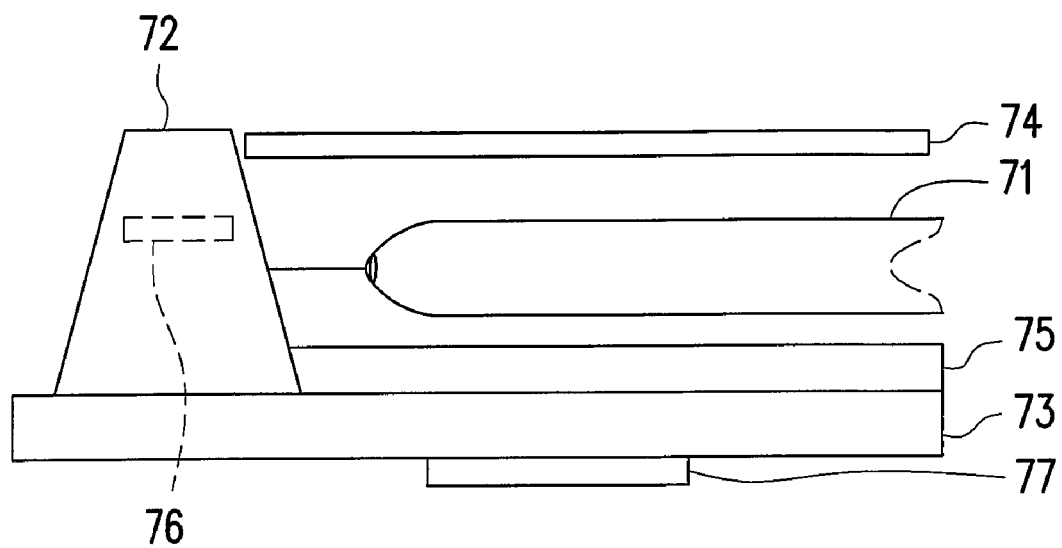
Figure 7D:
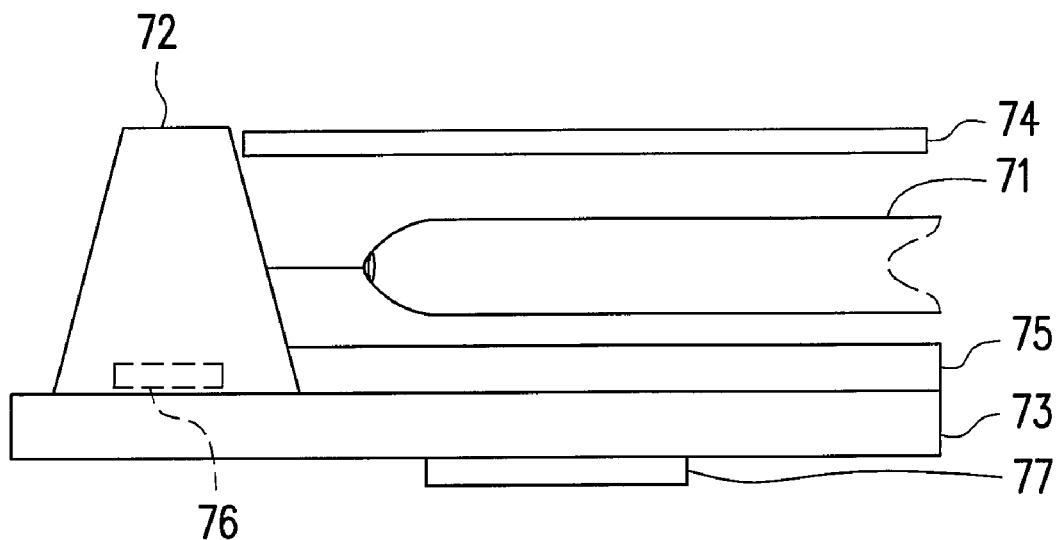

Similarly, referring to FIG. 7A, the backlight device of the present invention further includes a reflector 75 and a diffuser 74 in parallel to the reflector. The reflector 75 is disposed on the bottom of the lamp holder 72, for reflecting lights emitted by the lamp 71. The diffuser 74 is disposed on the top of the lamp holder 72, for diffusing lights emitted by the lamp 71 to form a surface light source.

The balance circuit board 76 is coupled to the lamp 71, and is joined with the lamp 71 through a connecter by means of welding or latching. As described above, as the balance circuit board 76 and the inverter circuit board are installed separately, there is no limitation where the balance circuit board can be disposed.

Referring to FIGS. 7A to 7D, the balance circuit board 76 may be disposed inside the lamp holder 72. For example, the balance circuit board 76 may be disposed on the left part of the lamp holder 72 in FIG. 7A, on the right part of the lamp holder 72 in FIG. 7B, on the upper part of the lamp holder 72 in FIG. 7C, or on the lower part of the lamp holder 72 in FIG. 7D.

Figure 7E:
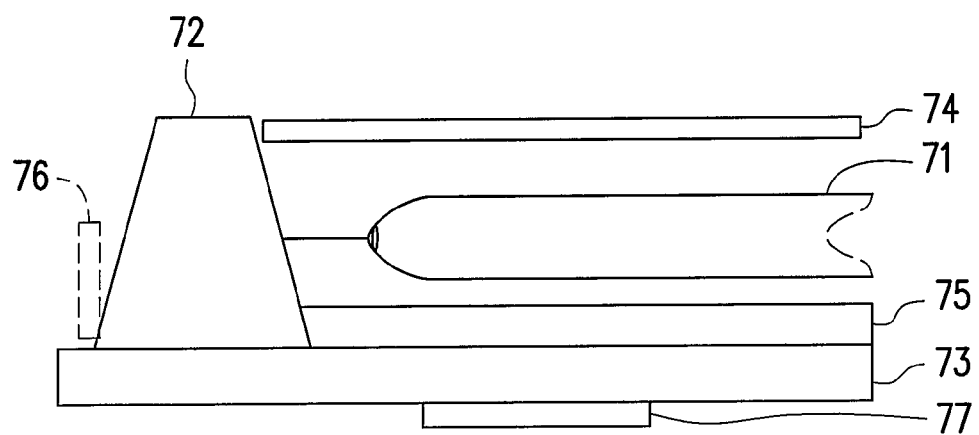
Figure 7F:
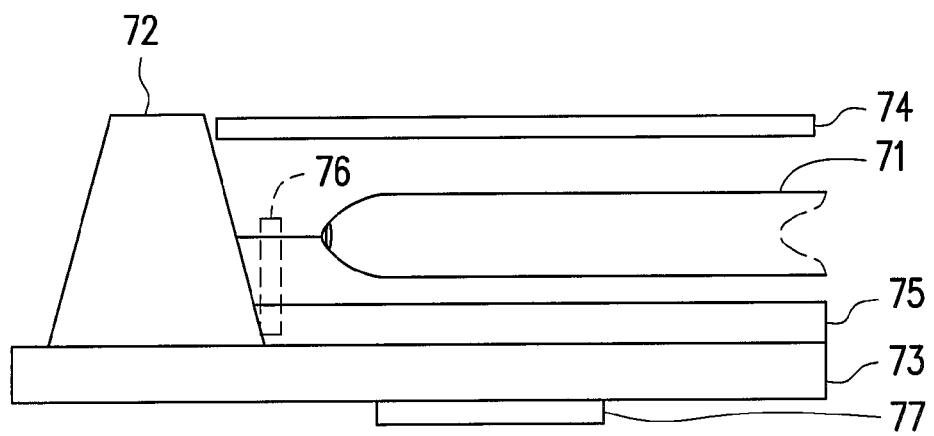
Figure 7G:
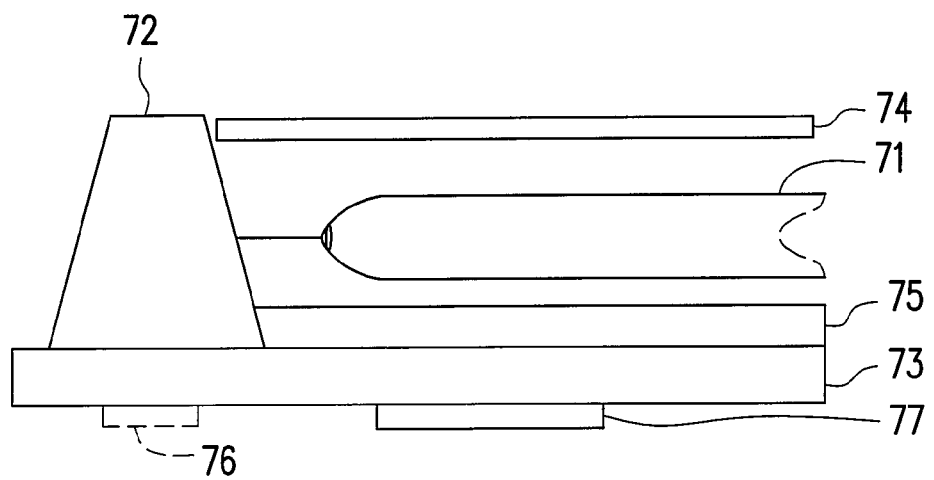

FIGS. 7E to 7G are side views of a backlight device according to another embodiment of the present invention. The structures of the backlight devices in these embodiments are similar to those in the above embodiments. The difference resides in that the balance circuit board 76 can be disposed outside the lamp holder 72. For example, the balance circuit board 76 may disposed at the left side of the lamp holder 72 in FIG. 7E, at the right side of the lamp holder 72 in FIG. 7F, or beneath the substrate 73 in FIG. 7G.

Though FIGS. 7A to 7G show embodiments of several arrangements of the balance circuit board 76, the present invention is not limited thereto. Persons of ordinary skill in the art should know that the balance circuit board 76 may be disposed according to actual requirements.

In view of the above, the light driver circuit device of the present invention is designed to install the inverter circuit and the balance circuit individually, so as to effectively reduce the space of the driving circuit and the total cost of the circuit design. Moreover, the balance circuit board is employed in the present invention, thus balancing the current in each CCFL effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight device, comprising:
   a substrate;
   a lamp disposed on a first side of the substrate;
   a lamp holder, disposed on the first side of the substrate, for fixing the lamp;
   an inverter module for providing at least a first driving voltage to drive the lamp; and
   a balance circuit board coupled to the lamp,
   wherein the inverter module is disposed at an inverter circuit board, and the balance circuit board is disposed to separate from the inverter circuit board, wherein the balance circuit board comprises at least one of a resistor, a capacitor, an inductor, a switch and the backlight device further comprising a reflector, disposed in parallel to the substrate on a bottom of the lamp holder, for reflecting lights emitted by the lamp; and a diffuser, disposed in parallel to the reflector on a top of the lamp holder, for diffusing lights emitted by the lamp to form a surface light source.

2. The backlight device according to claim 1, wherein the balance circuit board is disposed on the first side of the substrate and outside the lamp holder.

3. The backlight device according to claim 1, wherein the balance circuit board is disposed inside the lamp holder.

4. The backlight device according to claim 1, wherein the balance circuit board is disposed on the first side of the substrate.

5. The backlight device according to claim 4, wherein the inverter module is disposed on a second side of the substrate.

6. The backlight device according to claim 1, wherein the inverter module comprises a first transformer for providing the first driving voltage to a high-voltage terminal of the lamp.

7. The backlight device according to claim 6, wherein the inverter module further comprises a second transformer for providing a second driving voltage to the low-voltage terminal of the lamp.

8. The backlight device according to claim 1, wherein the lamp comprises a CCFL.

\* \* \* \* \*